United States Patent [19]
Greenaway

[11] 4,119,361
[45] Oct. 10, 1978

[54] MULTILAYER IDENTIFICATION CARD

[75] Inventor: David Leslie Greenaway, Birchwil, Switzerland

[73] Assignee: Landis & Gyr, Zug, Switzerland

[21] Appl. No.: 712,750

[22] Filed: Aug. 9, 1976

[30] Foreign Application Priority Data

Aug. 14, 1975 [CH] Switzerland .................. 10601/75

[51] Int. Cl.² .............................................. G09F 3/02
[52] U.S. Cl. ....................................... 350/1.1; 40/2.2; 283/7; 350/3.60
[58] Field of Search ............... 350/1, 3.5; 283/7; 40/2.2

[56] References Cited
U.S. PATENT DOCUMENTS

| | | | |
|---|---|---|---|
| 3,620,590 | 11/1971 | Barker | 350/3.5 |
| 3,732,640 | 5/1973 | Changnon | 40/2.2 |
| 3,802,101 | 4/1974 | Scantlin | 40/2.2 |
| 3,869,301 | 3/1975 | Decker et al. | 350/3.5 X |
| 3,894,756 | 7/1975 | Ward | 283/7 |
| 3,919,447 | 11/1975 | Kilmer, Jr. et al. | 283/7 X |

OTHER PUBLICATIONS

Fant et al., "Infrared Transparent Credit Card," *IBM Tech. Discl. Bulletin*, vol. 9, No. 7, Dec. 1966, p. 870.

*Primary Examiner*—F. L. Evans
*Assistant Examiner*—John D. Lee
*Attorney, Agent, or Firm*—Burns, Doane, Swecker & Mathis

[57] ABSTRACT

A multi-ply identification card for storage of machine-readable information includes optical markings disposed between protective layers. At least one of the protective layers can be penetrated by infrared light, and both are opaque to light of lesser wavelengths. The optical markings have a fine structure with at least 300 lines per mm and the protective layers are so connected to the optical markings that the markings are destroyed if one of the protective layers is removed.

6 Claims, 6 Drawing Figures

MULTILAYER IDENTIFICATION CARD

BACKGROUND OF THE INVENTION

Multilayer identification cards having optical markings which are contained in an information layer and can be read with the aid of a machine are in extensive use. Among the uses are as credit cards, checks, personal identity cards, season tickets, admission cards and the like. The cards thus serve as payment means, as identity documents, as proof of entitlement to public services, as means for obtaining goods from automatic service-providing machines, etc. In many applications it is required that the information stored on the identifying cards should be capable of being read by a machine and that the cards should be largely incapable of being falsified. Known identifying cards which can be read by a machine do not satisfactorily meet the requirement regarding prevention of falsification.

In a known multilayer credit card, the information that can be read by a machine takes the form of perforations in an information layer. In order to conceal the coded information from the human eye, the information layer is embedded between two protective layers which can be penetrated by infrared light, but through which visible light cannot pass. The information can be read with the aid of infrared light.

It is also known to protect identification cards against falsification by sealing a transparent envelope onto an opaque element which carries information that is printed thereon or applied in some other way, the envelope being made of the same material as the information-carrying element. If an attempt is made to remove the envelope, a refractive profiling, stamped into the surface of the envelope, is destroyed.

Additionally, it is known to store information in the form of holograms or diffraction screens on credit cards.

ADVANTAGES AND OBJECTS

An object of the invention is to provide an identification card which presents extremely great difficulty to copying thereof.

Another object is to provide an identification card having optical markings which cannot be copied with any rapidity at all.

Still another object of the invention is to provide a multilayer identification card having information therein in the form of optical markings which are subject to destruction by attempts to obtain access thereto.

Other objects and advantages of the invention will become apparent from the drawings and the following description.

THE DRAWING

FIGS. 1, 3, 5 and 6 illustrate in section on an enlarged scale respective preferred forms of my multilayer identification card with optical markings that can be read by light transmission procedures; and FIGS. 2 and 4 illustrate in a similar manner respective preferred forms of my multilayer identification cards with optical markings that can be read by light reflection procedures.

DETAILED DESCRIPTION

Figure 1:
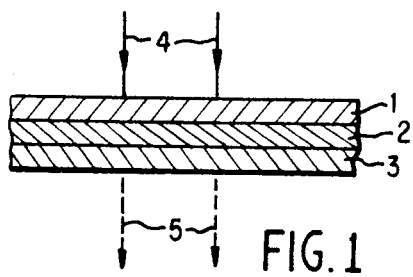

The present invention comprises generally an identification card containing information in the form of machine-readable optical markings contained between two protective layers. The layers prevent determination of the optical markings by ordinary observation and serve to prevent fradulent determination of those markings by removal of the layers. The card may be constructed for machine reading either by use of transmission or reflection procedures.

More particularly, the objects of the invention may be achieved by the combination of the following features:

(a) the optical markings are hidden or obscured between two protective layers, one of which at least can be penetrated by infrared light, and both protective layers are opaque to light of smaller wavelengths;

(b) the optical markings have a fine structure with at least 300 lines per mm; and (c) the protective layers are so connected to the information layer that the information is destroyed when one of the protective layers is removed.

Particular embodiments are more fully described hereinafter in connection with the drawing.

The identification card illustrated in FIG. 1 comprises a protective layer 1, an information layer 2 and a further protective layer 3. The information layer 2 is embedded between the two protective layers 1 and 3 and is so joined to them, in the manner explained below, that if an attempt is made to remove one of the protective layers 1 or 3 the information stored in the information layer 2 is destroyed.

The protective layers 1 and 3 can be penetrated by infrared light, but are opaque to light of shorter wavelengths. The optical markings (not shown in FIG. 1), which are provided in the information layer 2, are hidden between the two protective layers 1 and 3, and cannot be detected in visible light. One or more infrared reading light beams 4, which are directed onto the identification card from a reading apparatus (not illustrated) are able to penetrate the protective layers 1 and 3 without restriction and they leave the identification card as modulated information light beams 5.

Preferably, the protective layers 1 and 3 can be penetrated by light having wavelengths of approximately 9400 Å. This enables the identification card to be read with the aid of a Ga-As light emitting diode and Si photodetectors. Commercially available black plastics films, which have great transparency in the above-mentioned wavelength range, and which cannot be penetrated by visible light when they are of suitable thickness, are eminently suitable as protective layers.

The optical markings provided in the information layer 2 have a fine structure, with at least 300 lines per mm. They are preferably formed by at least one hologram or diffractive screen, but they may also be, for example, what are called kinoforms (described in "Optical Holography", pages 560–563, Academic Press, New York and London, 1971) or miniature Fresnel prisms (described in "The Phase Fresnel Lens", J. Opt. Soc. Amer. 51, 17, 1961). Such optical structures with a screen frequency of at least 300 lines per mm modulate the reading light beam 4 by diffraction or refraction. Imitation of such optical structures calls for extensive knowledge of the subject and for the use of technical aids that can only be obtained with great difficulty.

Any attempt to produce a photographic contact copy of the optical markings provided in the information layer 2 will fail, since infrared-sensitive photograhic copying material generally has a resolution capacity of approximately 20 lines per mm, but never one of more than 100 lines per mm. Reproduction with a high magnification factor on infrared-sensitive material followed by reduction to the original shape and size lead to technical problems which are virtually insurmountable. Finally, if an attempt is made to dissolve away the covering layers 1 and 3 in order to operate with light in the visible wavelengths range, the fine structure of the optical markings and hence the information are destroyed.

Prevention of optical copying can be made more certain if the optical markings are refractive or diffractive phase structures. Suitable such phase structures include the already mentioned holograms, diffraction screens, kinoforms and miniature Fresnel prisms. It is well known that in order to make a direct optical copy of phase information it is necessary to use complex optical phase-contrast equipment which converts the phase information into amplitude information, and only provides good results if the phase information is stored on an optically last substrate. The information layer 2, which is used as the substrate for the phase information, is in practice anything but optically flat. Instead, layer 2 exhibits areas of unevenness, due to the nature of the material and the method of manufacture, which appear in the phase-contrast equipment as factors which interfere with amplitude.

Figure 2:
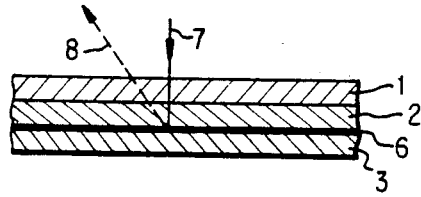

FIG. 2 illustrates an identification card which can be read by reflection and which differs from the identification card of FIG. 1, readable by transmission, only in that in the FIG. 2 card a thin reflection layer 6 is interposed between the information layer 2 and the protective layer 3. When the identification card is being read, an infrared reading light beam 7 is reflected by the reflection layer 6 and the reflection emerges from the card as a modulated information light beam 8. In this case, the protective layer 3 may be transparent or opaque.

Figure 3:
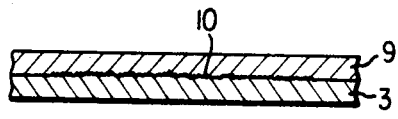
Figure 4:
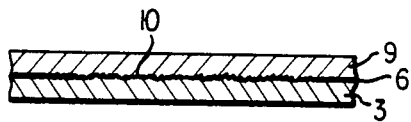

FIG. 3 shows an identification card readable by transmission, and FIG. 4, a card readable by reflection. In each case the protective layer 9 additionally serves as the information layer. It is therefore necessary to join together only two layers in these embodiments, the joining being in such a way that the information is destroyed when the layers are separated from each other. The optical markings, designated by the numeral 10 in FIGS. 3 and 4, are preferably impressed in the protective layer 9, which is made of plastics material. In FIG. 4, they are covered by the reflection layer 6. The second protective layer 3 in FIG. 4 is laminated with the layer 9 or 6 in such a way that an intimate bond is achieved. The protective layer 3 may be a lacquer layer which reacts chemically with the contiguous layer. It may however be bonded on with an adhesive that reacts chemically with both layers. In both cases the chemical reaction is limited to a thin boundary layer so that the optical markings 10 are not destroyed.

The reflection layer 6 shown in FIG. 4 is preferably a metallic layer having a thickness of a few 100 Å. A reflection layer of this kind, on the one hand, has a sufficiently great reflection factor to ensure that the information can be read without any difficulty. On the other hand, it is porous enough for the bond to be established between the protective layers 9 and 3 by way of the pores in the reflection layer 6.

Figure 5:
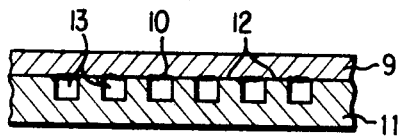

FIG. 5 illustrates a modified form of identification card having a second protective layer 11, the inner face of which has a cellular surface structure with punctiform contact zones 12 and recesses 13. The bond between the protective layer 11 and the protective layer 9, having the optical markings 10, can here be established in such a way that the information in the punctiform contact zones 12 is destroyed, but is retained in the zone of the recesses 13. This enables the protective layers 9 and 11 to be joined together by the application of pressure and heat.

Figure 6:
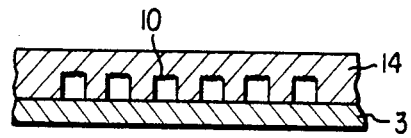
Figure 1:
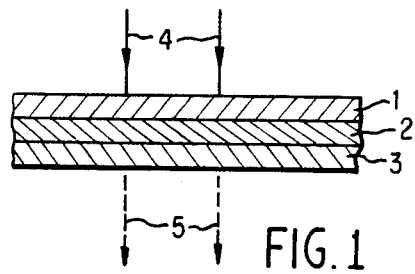
Figure 2:
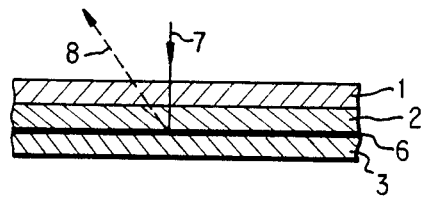
Figure 3:
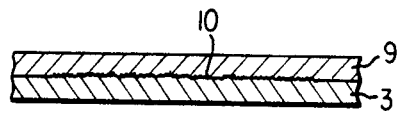
Figure 4:
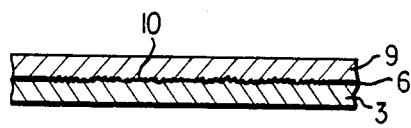
Figure 5:
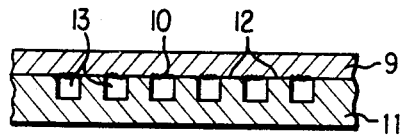
Figure 6:
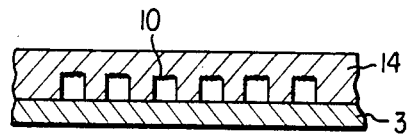

Finally, FIG. 6 illustrates an identification card which comprises a protective layer 14 having a cellular surface structure, and a planar protective layer 3, the optical markings 10 being impressed in the bottoms of the cells of the protective layer 14.

The cellular surface structure of one of the protective layers 11 and 14 shown in FIGS. 5 and 6, respectively, can also be used in the case of an identification card readable by reflection, as will appear from the modifications of the invention described above.

The several layers of the identification card of the invention are preferably made of the same or similar material. In such case, an effort to remove a protective layer by means of a chemical solvent causes the information to inevitably be destroyed.

The principles, preferred embodiments and modes of operation of the present invention have been described in the foregoing specification. However, the invention intended to be protected is not to be construed as limited to the particular forms disclosed, which forms are to be regarded as illustrative rather than restrictive. Accordingly, variations and changes may be made by those skilled in the art without departing from the spirit and scope of the present invention.

What is claimed is:

1. A card for storing information for optical reading comprising:
    optical marking means indicative of said information;
    a protective layer on each side of said optical marking means, both of said layers being opaque to light of shorter wavelength than infrared light and at least one of said protective layers being penetratable by infrared light;
    said optical marking means being provided at the inner face of one of said protective layers and having a cellular surface structure with at least 300 lines per mm to inhibit photographic copying of said information with the use of infrared light; and
    said protective layers being so connected to said optical marking means that removal of either of said protective layers therefrom will destroy said optical marking means to inhibit copying or viewing of said information.

2. A card for storing information for optical reading comprising:
    an information layer including optical marking means indicative of said information;
    a protective layer on each side of said information layer, at least one of said protective layers being penetratable by infrared light and opaque to light of shorter wavelength than infrared light;
    a layer reflective to infrared light on the side of said information layer opposite said at least one protective layer;
    the markings of said optical marking means being formed of a line structure with at least 300 lines per mm to inhibit photographic copying of said information with the use of infrared light;
    said protective layers being so attached with said information layer that removal of either of said protective layers therefrom will destroy said optical marking means to inhibit viewing or copying of said information.

3. A card as recited in claim 2 wherein a porous reflective layer is interposed between said information layer and one of said protective layers, said one of said protective layers being bonded to said information layer by way of the pores of said reflective layer.

4. A card for storing information for optical reading comprising:
a first protective layer of plastic material;
optical marking means indicative of said information impressed at one side of said first protective layer, said optical marking means having a structure with at least 300 lines per mm to inhibit photographic copying of said information with the use of infrared light;
a metal reflective layer covering said optical marking means;
a second protective layer; and
means chemically bonding said one side of said first protective layer, said reflective layer, and one side of said second protective layer together in such manner that said optical marking means will be destroyed if said protective layers are separated to inhibit viewing or copying of said information; and
said first protective layer being penetratable by infrared light and opaque to light of shorter wavelength than infrared light.

5. A card for storing information for optical reading comprising:
first and second protective layers joined together;
one said protective layer having an inner face of cellular surface structure with alternate punctiform contact zones and recesses, both of said protective layers being opaque to light of shorter wavelength than infrared light and at least one of said layers being penetratable by infrared light;
optical marking means indicative of said information disposed at the surface of one of said protective layers adjacent a surface of said other protective layer at locations corresponding to at least some of said punctiform contact zones or recesses, said optical means having a structure with at least 300 lines per mm to inhibit photographic copying of said information with the use of infrared light.

6. A card for storing information for optical reading comprising:
first and second protective layers joined together;
one of said protective layers having a substantially planar inner surface and the other of said protective layers having an inner surface structue with alternate punctiform contact zones and recesses, both cf said protective layers being opaque to light of shorter wavelength than infrared light and at least one of said protective layers being penetratable by infrared light; and
optical marking means indicative of said information disposed in said recesses in the inner surface of said other of said protective layers, said optical means having a structure with at least 300 lines per mm to inhibit photographic copying of said information with the use of infrared light.

* * * * *